United States Patent

Fialla

[11] Patent Number: 5,321,125
[45] Date of Patent: Jun. 14, 1994

[54] AROMATIC-POLYESTER MOLDED ARTICLE COMPRISING A TRANSLUCENT, SUBSTANTIALLY PORE-FREE SINTERED BODY

[75] Inventor: Peter Fialla, Maria Enzersdorf, Austria

[73] Assignee: Isonova Technische Innovationen Ges.m.b.H., Austria

[21] Appl. No.: 930,532

[22] PCT Filed: Jul. 26, 1991

[86] PCT No.: PCT/AT91/00091
§ 371 Date: Oct. 2, 1992
§ 102(e) Date: Oct. 2, 1992

[87] PCT Pub. No.: WO92/13698
PCT Pub. Date: Aug. 20, 1992

[30] Foreign Application Priority Data

Feb. 2, 1990 [AT] Austria ............... 221/90

[51] Int. Cl.$^5$ ............... C08G 63/00; C08G 63/02
[52] U.S. Cl. .................. 528/190; 528/176; 528/193; 428/480
[58] Field of Search .......... 528/176, 190, 193; 264/126, 331.21; 428/480

[56] References Cited

U.S. PATENT DOCUMENTS

| | | |
|---|---|---|
| 3,558,550 | 1/1971 | Zuliani et al. |
| 3,829,406 | 8/1974 | Cottis et al. |
| 3,884,876 | 5/1975 | Cottis et al. |
| 3,980,749 | 9/1976 | Cottis et al. .......... 264/331 |
| 4,064,077 | 12/1977 | Gale. |
| 4,387,209 | 6/1983 | Rieder et al. .......... 528/176 |
| 4,388,454 | 6/1983 | Rieder et al. .......... 528/176 |
| 4,418,122 | 11/1983 | Rieder et al. .......... 428/480 |
| 4,446,195 | 5/1984 | Rieder et al. .......... 428/458 |
| 5,102,974 | 4/1992 | Fialla .......... 528/193 |

FOREIGN PATENT DOCUMENTS

WO91/11312 8/1991 World Int. Prop. O. .... B29C 43/00

OTHER PUBLICATIONS

Datenbank Chemical Abstracts (STN), vol. 85, No. 18, 1976 (Columbus, Ohio, US), V. P. Sidorova et al.: "Physical Properties of Heat Resistant Aromatic Polymers", see Abstract No. 124795n & Plast. Massy, vol. 7, pp. 56-59, 1976.
Polymer Science U.S.S.R., vol. 21, 1979, (Oxford, GB), V. V. Korshak et al.: "Thermal Degradation of Pressure Moulded Aromatic Polyamides" pp. 34-38, see p. 32, lines 3-12.

Primary Examiner—John Kight, III
Assistant Examiner—T. Mosley
Attorney, Agent, or Firm—Bacon & Thomas

[57] ABSTRACT

Translucent, pore-free sintered aromatic polyesters made from diphenols such as 1,1-bis(4-hydroxyphenyl)-fluorene and phthalic-acid halides evince one or more glass transition points in the range of 220° to 400° C. and a tensile strength larger than 40 N/mm$^2$ but advantageously larger than 60 N/mm$^2$. They also evince higher resistance to some solvents such as carbon tetrachloride when in the form of poured films as regards the same material. To manufacture the sintered article, the polyester powder is subjected in a closed mold to a pressure larger than 3,000 N/cm$^2$, the mold meantime being slowly heated and then kept for an appreciable time above the glass transition point and thereupon being slowly cooled. As a rule the sintered articles are used as semi-finished products or as pre-formed component-blanks from which the desired end products are made by mechanical cutting.

8 Claims, No Drawings

AROMATIC-POLYESTER MOLDED ARTICLE COMPRISING A TRANSLUCENT, SUBSTANTIALLY PORE-FREE SINTERED BODY

TECHNICAL FIELD

The invention concerns a molded body essentially consisting of one or several aromatic polyesters, namely polyarylates, which are manufactured from phthalic-acid halides and diphenols of formula

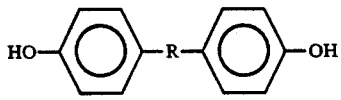

where R is a bifunctional hydrocarbon residue containing at least one aromatic or cycloaliphatic ring. The invention moreover concerns an advantageous method for making such an article.

STATE OF THE ART

Articles of this kind are known for instance from the European patents 64,971 and 64,972, namely in the form of sheets made from a polyester solution by pouring. The polyester described in the European patent 64,972 is made from 1,1-bis(4-hydroxyphenyl)-phenylethane and it was found such can be processed only with difficulty because of the high required processing temperatures of 330° to 400° C., whereas the polyester of the European patent 64,971 made from 9,9-bis(4-hydroxyphenyl)-fluorene lacks any melting range at all, instead already starting to thermally decompose at a raised temperature of about 400° C. The Russian publication PLASTICHESKIE MASSY, Nr. 7, 1976, p 56, "Physical properties of heat-resistant aromatic polymers", of which the English translation was published in INTERNATIONAL POLYMER SCIENCE AND TECHNOLOGY, vol. 3, #11, 1976, compares the properties of polyarylate films with blocks made of the same material molded at high temperatures. It was found that as rule the foils evince higher densities than blocks made of the same material but that the solubilities are the same in several common solvents. Now adequate solubility of such polyarylates in suitable solvents is the precondition for their being processed into films using pouring methods. On the other hand such solubility precludes many applications for polyarylates that demand substantial resistance to chemicals and solvents.

DISCUSSION OF THE INVENTION

The first object of the invention is to create an article of the initially cited kind which contrary to the case of the sheets shall be able to assume a substantially arbitrary three-dimensional shape and which also shall evince higher solvent resistance than poured foils made form the same plastic.

This problem is solved by the molded article of the invention, which is characterized in that it consists of a translucent, substantially pore-free sintered body with one or more glass transition point(s) in the range of 220° to 400° C. measured by the DSC method, further evincing a DIN 53455 tensile strength larger than 40N/mm², advantageously however larger than 60N/mm², and where a test specimen about 1.0 mm thick shall absorb hydrocarbon chloride at rates less than 1.0%, advantageously less than 0.8% of the specimen weight for a test duration of 24 h in a bath of carbon tetrachloride at 23° C.

Now it was discovered that with equal kind and quality of the raw material, the sintered articles of the invention evince higher resistance to some solvents such as carbon tetrachloride compared to poured sheets. On this and other grounds which shall be further discussed below, it may be concluded with fair probability that the polyester substance forming the sintered article is crosslinked to some extent.

In one advantageous implementation of the invention, the sintered article of the invention consists essentially of an aromatic polyester based on 9,9-bis(4-hydroxyphenyl)-fluorene as diphenol. In another advantageous implementation of the sintered article of the invention, said article essentially consists of an aromatic polyester based on 1,1-bis-(4-hydroxyphenyl)-1-phenylethane and evinces a DIN 53455 tensile strength larger than 50N/mm², in particular however larger than 70N/mm².

Moreover the invention concerns an advantageous method for making the article molded in the manner of the invention. This method is characterized in that the aromatic polyester(s) in powder form are compacted under pressure, in that the compacted powder is slowly heated, while the pressure is maintained, to temperatures higher than the glass transition point(s) of the polyester(s) used, in that the powder material so compressed and pressurized is kept at those temperatures for a substantial dwell-time in order to form a sintered article and in that the article sintered in this manner shall be slowly cooled. The powder-form polyester(s) are compacted in this process at a pressure exceeding 3,000N/cm², preferably however in excess of 5,000N/cm², for instance about 10,000N/cm².

In advantageous implementations of the method of the invention, the slow heating of the compressed polyester powder takes place at a rate of 1.5° to 4.0° C./min and/or the slow cooling of the sintered article takes place at a rate of 0.5° to 2.5° C./min.

In another advantageous implementation of the method of the invention, the dwell-time is in the range of 5–20 min/mm of the mean thickness determined in the direction of the applied pressure of the sintered article to be manufactured.

In a yet further advantageous implementation of the method of the invention, the cooling of the sintered article is carried out at least in part while at a pressure which is much reduced compared to the maximum applied pressure. In a last advantageous implementation of the method of the invention, the sintered article is cooled at least in part at a pressure which is much reduced compared to the applied maximum pressure.

SEVERAL WAYS TO IMPLEMENT THE INVENTION

The invention is elucidated below in relation to Examples. The sintered articles made according to these Examples consist of aromatic polyesters as described in the European patents 64,972 and 64,971, namely 1. Aromatic polyesters based on 1,1-bis(4-hydroxyphenyl)-1-phenylethane and phthalic-acid chloride (iso-tere 50/50) with a glass transition point of 250° C. measured by DSC and hereafter called CPE,
2. Aromatic polyesters based on 9,9-bis-(4-hydroxyphenyl)fluorene and phthalic-acid chloride (iso/tere 50/50) with a glass transition point of 325° C. measured by DSC and hereafter called FPE.

The raw material for the manufacture of the sintered articles are the polyesters in synthetic powder form which evince a mean molecular weight MW of 50,000 to 1,200,000, corresponding to an inherent viscosity in the range of 0.5 to 3.8 dl/g (measured in the manner of the above cited European patents). The screen fractions of the synthetic polyester powder with particles sizes less than 600μ, advantageously between 50 and 400μ, shall be used.

Because of low particle sizes, these powder fractions evince high sintering activity. However by discarding the finest fractions, the bulk density is prevented from being unduly small, an eventuality which would be disadvantageous for pressing.

The manufacture of a CPE sintered article by means of a so-called compression sintering process is described in further detail herebelow.

A heated mold is used to make the sintered panel with dimensions 200×220×4 mm. Upon preheating the mold to 150° C., the CPE powder already previously heated at 150° C. for several hours in a vacuum oven is introduced in bulk form with a density of 0.35 g/cm$^3$ and in a suitable amount into the molding space of the lower mold half and the mold is closed by depositing on it the upper mold half entering the molding space. The mold is then moved into a press and the CPE powder is compressed at a pressure of 5,000N/cm$^2$, the mold being slowly heated, that is at a rate of about 2° C./min to a temperature of 270° C., that is, above the CPE powder glass transition point of 250° C., and said temperature of 270° C. is maintained for about 60 min. Thereupon the mold is cooled at a rate of about 1° C./min to 230° C., the compression is reduced to a low value of about 20N/cm$^2$ with the essential purpose merely to allow good heat dissipation, and then the mold is cooled further to 50° C. and the finished sintered article is removed from the mold. The sintered body so made evinces a glass transition point of 250° C. as determined by ASTM D 3418-82 and a density of 1.21 g/cm$^3$.

FPE-powder sintered articles may be manufactured in the same manner. In contrast with the manufacture of CPE sintered articles, a dwell-temperature of 330° C. (higher than the glass transition point of 325° C.) was used for FPE and the pressure relief during cooling took place at 290° C. The FPE sintered article so made evinces a glass transition point of 325° C. and a density of 1.22 g/cm$^3$.

The CPE or FPE sintered articles evince an amber color and are resistant to alcohols, oils and fats.

As already mentioned initially, compared with poured, pore-free sheets, the sintered articles evince higher resistance to some solvents such as carbon tetrachloride.

A poured sheet and a sintered article were made each from CPE and FPE with each a mean molecular weight of about 500,000. Following re-dissolution of the sheet or sintered-article material, the sheet material retained a molecular weight of 500,000 whereas the sintered material molecular weight had dropped to 50,000. Contrary to expectation, which was that the lower molecular weight of the sintered article would entail lower resistance to solvents, the sintered article did evince higher resistance to certain solvents than did the sheet material.

Comparison test results are shown below that relate to absorption of carbon tetrachloride by test samples, namely CPE and FPE sintered articles and sheet specimens resp., made from the same aromatic polyesters.

The tests were carried out on square specimens about 0.7 to 1.1 mm thick and 24×24 mm resp. A sheet specimen (F) and a sintered-article specimen (X) were kept at room temperature (23° C.) immersed in beakers filled with carbon tetrachloride for 4 h and 24 h and, thereupon, after wiping dry the surface, they were weighed and measured.

The results are as follows:

| Polyester | Specimen | Thickness (mm) | Weight 0 h, g | Weight, 4 h, g | % increase in weight | % increase in weight 24 h | % weight increase |
|---|---|---|---|---|---|---|---|
| CPE | 1X | 0,93 | 0,5935 | 0,5945 | 1,685 | 0,5963 | 4,718 |
|  | 1F | 0,95 | 0,5579 | 0,5805 | 4,499 | 0,5878 | 17,131 |
| CPE | 2X | 1,02 | 0,7060 | 0,7073 | 1,841 | 0,7096 | 5,099 |
|  | 2F | 1,048 | 0,7052 | 0,7091 | 5,530 | 0,7178 | 17,867 |
| CPE | 3X | 0,749 | 0,5059 | 0,5071 | 2,372 | 0,5089 | 5,930 |
|  | 3F | 0,743 | 0,5144 | 0,5166 | 4,277 | 0,5214 | 13,608 |
| FPE | 4X | 0,98 | 0,8822 | 0,8834 | 1,360 | 0,8854 | 3,627 |
|  | 4F | 0,995 | 0,8022 | 0,8072 | 6,233 | 0,8202 | 22,438 |
| FPE | 5X | 1,008 | 0,8929 | 0,8940 | 1,232 | 0,8971 | 4,704 |
|  | 5F | 1,01 | 0,8188 | 0,8230 | 5,129 | 0,8428 | 29,311 |

As shown by the above Table, the absorption of solvent after 24 h exposure is a multiple for the sheet specimens than for the corresponding sinter-article specimens. On the other hand, in the light of the known Russian publication, there could be no differences in solubility between the specimens of sheets and of blocks pressed at higher temperatures, as explicitly stated for polyarylate products. In retrospect, the explanation may be that those blocks investigated by and in accordance with the Russian publication might not have been pore-free. In fact applicant carried out measurements on sintered articles that were not translucent because of insufficient sintering and manifestly still contained pores and found values of carbon-tetrachloride absorption substantially higher than for the translucent, pore-free sintered articles made according to this invention.

An improved method for sintering is described below. A mold is used in that method which is not self-heating but on the other hand it can be locked under pressure. After being filled with the polyester powder (CPE or FPE), this mold is moved into a press wherein the compressed material is pressed by 10,000 N/m$^2$ and the mold is locked under pressure, as a result of which even after the mold has been removed from the press, the two mold halves continue exerting a high pressure on the compressed material. Thereupon the mold is slowly heated in an oven at a rate of 2° C./min to 279° C. (for CPE) and to 330° C. (for FPE) and those temperatures are maintained for 60 min when making a sintered panel 4 mm thick. Thereafter the oven heater is shut off and the mold is allowed to cool. After it reaches a temperature 20° C. below the particular glass transition point, the mold is then further cooled outside the oven down to 50° C. and then the finished sintered article is removed from it.

It is important in the manufacture of the sintered articles that the mold be slowly heated and cooled. The permissible heating and cooling rates will be the smaller, the larger the thickness of the sintered article to be made. Similar considerations apply also to the maximum mold-temperature dwell-times to be observed. As a rule of thumb, the dwell time ought to be about 15 min/mm of thickness of sintered article.

Several essential properties of the CPE or FPE sintered articles manufactured in the above manner are listed in the Tables below.

1. Mechanical Properties (DIN, room temperature)

| Property | Unit | CPE | FPE |
|---|---|---|---|
| Tensile strength | N/mm$^2$ | 87 | 72 |
| Tear resistance | % | 9.4 | 4.2 |
| Young's modulus (traction) | N/mm$^2$ | 2500 | 2800 |
| Bending strength | N/mm$^2$ | 125 | 123 |
| Young's modulus (bending) | N/mm$^2$ | 2550 | 2780 |
| Hardness | | | |
| Rockwell M | | 104 | 117 |
| Shore D | | 88 | 91 |

2. Tribological Properties
Measured on pin-pane apparatus per DIN 31680. Pane is made from rolled bearing steel with a surface roughness $R_p = 2$ microns

| | Units | CPE | FPE |
|---|---|---|---|
| Coefficient of friction | | 0.8 | 0.8 |
| Wear coefficient | mm$^3$/Nm | $3.5 \times 10^{-6}$ | $19.0 \times 10^{-6}$ |

3. Thermal Properties

| | Units | CPE | FPE | Procedure |
|---|---|---|---|---|
| Glass transition point | °C. | 250 | 325 | DSC |
| Thermal dimensional stability (procedure A) | °C. | 217.5 | 307 | TMA |
| Linear expansion coefficient | K$^{-1}$ | $75 \times 10^{-6}$ | $70 \times 10^{-6}$ | TMA |
| Thermal conductivity | W/mK | 0.19 | 0.25 | |

4. Electrical Properties

| PROPERTY | UNIT | PRE-TREATMENT | CPE thickness (mm) value | FPE thickness (mm) value |
|---|---|---|---|---|
| Dielectric ratio at 1 MHz | | Climate control C48 h/23° C./50% | 3.68 | 4.55 |
| | | Storage in water D24 h/23° C. | 3.03 | 4.13 |
| Dissipation factor at 1 MHz | | Climate control C48 h/23° C./50% | $18.7 \times 10^{-3}$ | $16.4 \times 10^{-3}$ |
| | | Storage in water D24 h/23° C. | $23.2 \times 10^{-3}$ | $17.5 \times 10^{-3}$ |
| Volume resistance | ohm | climate control C48/23° C./50% | 3.25 $2 \times 10^{14}$ | 3.97 $1 \times 10^{15}$ |

5. Hygroscopic Properties

| PROPERTY | UNIT | CPE | FPE |
|---|---|---|---|
| Water absorption (storage in water, 23° C., 24 h) | % | 0.20 | 0.25 |

6. Combustible Properties

| OXYGEN INDEX | | |
|---|---|---|
| | CPE | 33.5% |
| | FPE | 40.0% |

INDUSTRIAL APPLICABILITY

As a rule the described sintered articles serve as semi-finished goods or as preformed construction blanks from which the desired end products then can be finished by conventional cutting processing.

I claim:

1. A molded article comprising a translucent, substantially pore-free sintered body, consisting essentially of one or more aromatic polyesters, manufactured from phthalic-acid halides and diphenols of the formula

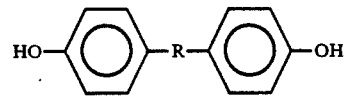

where R is a bifunctional hydrocarbon residue containing at least aromatic or cycloaliphatic ring, said article having one or more glass transition point(s) in the range of 220° to 400° C. measured the DSC procedure and a DIN 53455 tensile strength larger than 40 N/mm$^2$ and wherein said article in the form of a test specimen about 1.00 thick, evinces a carbon tetrachloride absorption less than 1.0% of the specimen weight for a treatment duration of 25 h in a 23° C. bath of carbon tetrachloride.

2. Article defined in claim 1, wherein it essentially consists of an aromatic polyester based 9,9-bis-(4-hydroxyphenyl)fluorene as diphenol.

3. Article defined in claim 1, wherein it essentially consists of an aromatic polyester based on 1,1-bis-(4-hydroxyphenyl)-1-phenylethane and evinces a DIN 53455 tensile strength larger than 50 N/mm 4. A method for manufacturing a molded article defined in claim 1, comprising compacting the aromatic polyester(s) in powder under a pressure of 5,000 N/cm$^3$ or greater, maintaining the compacted powder under pressure while slowly raising its temperature to temperatures higher than the glass transition point(s) at a rate of 1.5° to 4.0° C/min., maintaining the compacted powder for a dwell-time at these temperatures to form a sintered article, and slowing cooling the article.

5. Method defined in claim 4, wherein the powder polyesters are compacted under a pressure of about 10.000 N/mm 6. Method defined in claim 4, wherein the slow cooling of the sintered article takes place at a rate of 0.5° to 2.5° C/min.

7. Method defined in claim 4, wherein the dwell-time is in the range of 5 to 20 min/mm of the mean thickness of the sintered article to be made as determined in the direction of the applied pressure.

8. Method defined in claim 4, wherein the cooling of the sintered article takes place at part under a pressure much reduced in comparison with the applied maximum pressure.

* * * * *

UNITED STATES PATENT AND TRADEMARK OFFICE
CERTIFICATE OF CORRECTION

PATENT NO. : 5,321,125
DATED : June 14, 1994
INVENTOR(S) : Peter Fialla

It is certified that error appears in the above-identified patent and that said Letters Patent is hereby corrected as shown below:

Column 6:
    Claim 1, line 7, after "least" insert --one--; and line 9, after "measured" insert --by--.

Claim 2, line 2, after "based" insert --on--.

Claim 4, line 3, after "powder" insert --form--;

line 8, after "a" (first occurrence) insert --substantial--; and line 9, after "the" insert --sintered--.

Column 8:
    Claim 8, line 2, after "at" insert --least in--.

Signed and Sealed this

Twentieth Day of September, 1994

Attest:

BRUCE LEHMAN

*Attesting Officer*     *Commissioner of Patents and Trademarks*